US011297424B2

(12) United States Patent
Kleijn et al.

(10) Patent No.: US 11,297,424 B2
(45) Date of Patent: Apr. 5, 2022

(54) JOINT WIDEBAND SOURCE LOCALIZATION AND ACQUISITION BASED ON A GRID-SHIFT APPROACH

(71) Applicant: GOOGLE LLC, Mountain View, CA (US)

(72) Inventors: Willem Bastiaan Kleijn, Eastborne Wellington (NZ); Jan Skoglund, San Francisco, CA (US); Christos Tzagkarakis, Delft (NL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/624,704

(22) PCT Filed: Oct. 10, 2018

(86) PCT No.: PCT/US2018/055309
§ 371 (c)(1),
(2) Date: Dec. 19, 2019

(87) PCT Pub. No.: WO2019/075135
PCT Pub. Date: Apr. 18, 2019

(65) Prior Publication Data
US 2020/0120419 A1  Apr. 16, 2020

Related U.S. Application Data

(60) Provisional application No. 62/570,235, filed on Oct. 10, 2017.

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01)

(58) Field of Classification Search
CPC .............................. H04R 3/005; H04R 1/406
See application file for complete search history.

(56) References Cited

U.S. PATENT DOCUMENTS 10,670,694 B1 * 6/2020 Youssef ................... G01S 5/20
2012/0093336 A1 * 4/2012 Said ......................... G01S 5/18
381/92

(Continued)

OTHER PUBLICATIONS

Cetin, M. et al., "A Sparse Signal Reconstruction Perspective for Source Localization with Sensor Arrays", IEEE Transactions on Signal Processing, vol. 53, No. 8, Aug. 2005, pp. 3010-3022, XP011136485.

(Continued)

*Primary Examiner* — David L Ton
(74) *Attorney, Agent, or Firm* — Brake Hughes Bellermann LLP

(57) ABSTRACT

Techniques of source localization and acquisition involve a wideband joint acoustic source localization and acquisition approach in light of sparse optimization framework based on an orthogonal matching pursuit-based grid-shift procedure. Along these lines, a specific grid structure is constructed with the same number of grid points as compared to the on-grid case, but which is "shifted" across the acoustic scene. More specifically, it is expected that each source will be located close to a grid point in at least one of the set of shifted grids. The sparse solutions corresponding to the set of shifted grids are combined to obtain the source location estimates. The estimated source positions are used as side information to obtain the original source signals.

23 Claims, 5 Drawing Sheets

(56) References Cited

U.S. PATENT DOCUMENTS

| | | | |
|---|---|---|---|
| 2012/0195436 A1* | 8/2012 | Nakadai | H04R 3/005 381/56 |
| 2015/0055797 A1* | 2/2015 | Nguyen | H04R 3/005 381/92 |
| 2015/0156578 A1* | 6/2015 | Alexandridis | H04R 3/005 381/92 |

OTHER PUBLICATIONS

International Search Report and Written Opinion for International Application No. PCT/US2018/055309, dated Jan. 23, 2019, 18 pages.

Le Roux, Jonathan et al., "Source Localization in Reverberant Environments Using Sparse Optimization", International Workshop on Acoustic Signal Enhancement, May 1, 2013, pp. 4310-4314, XP055535700.

* cited by examiner

JOINT WIDEBAND SOURCE LOCALIZATION AND ACQUISITION BASED ON A GRID-SHIFT APPROACH

CROSS REFERENCE TO RELATED APPLICATION

This application is a 35 U.S.C. § 371 National Phase Entry Application from PCT/US2018/055309 filed Oct. 10, 2018, designating the U.S., and claims the benefit of U.S. Provisional Application No. 62/570,235, filed Oct. 10, 2017, the disclosures of which are incorporated herein by reference in their entireties.

TECHNICAL FIELD

The details of one or more implementations are set forth in the accompanying drawings and the description below. Other features will be apparent from the description and drawings, and from the claims.

BACKGROUND

Some source localization problems are cast as a sparse recovery problem by discretizing the acoustic scene using a grid of a certain size. In this case, it may be assumed that the center of each grid cell, termed a grid point, corresponds to a possible source position leading to the sparsification of the problem since only a few grid points will be non-zero/active due to the presence of sources. It may also be assumed that the acoustic sources correspond to speech signals, and thus a time-frequency disjoint property can be adopted, i.e., the sources do not overlap in each time-frequency spectrographic region.

Conventional compressed sensing (CS) techniques specify conditions, e.g., a restricted isometry property, under which the sparsity-based localization problem can be solved efficiently. A hypothesis used in this framework states that there is an exact match between the real physical model and the assumed one, reflected in the grid structure. This implies that the acoustic sources lie exactly on the grid points.

SUMMARY

In one general aspect, a method can include obtaining, by processing circuitry of a computer, a plurality of acoustic sound field measurements at a plurality of respective microphone positions, the plurality of acoustic sound field measurements resulting from a specified number of acoustic sources; generating a plurality of grid systems, each of the plurality of grid systems having a respective plurality of grid points; identifying the specified number of grid points of the plurality of grid points of each of the plurality of grid systems; generating a grid location data structure based on the respective, specified number of grid points for each of the plurality of grid systems; and determining locations of the specified number of acoustic sources based on the grid location data structure.

The details of one or more implementations are set forth in the accompanying drawings and the description below. Other features will be apparent from the description and drawings, and from the claims.

DETAILED DESCRIPTION

Figure 1:
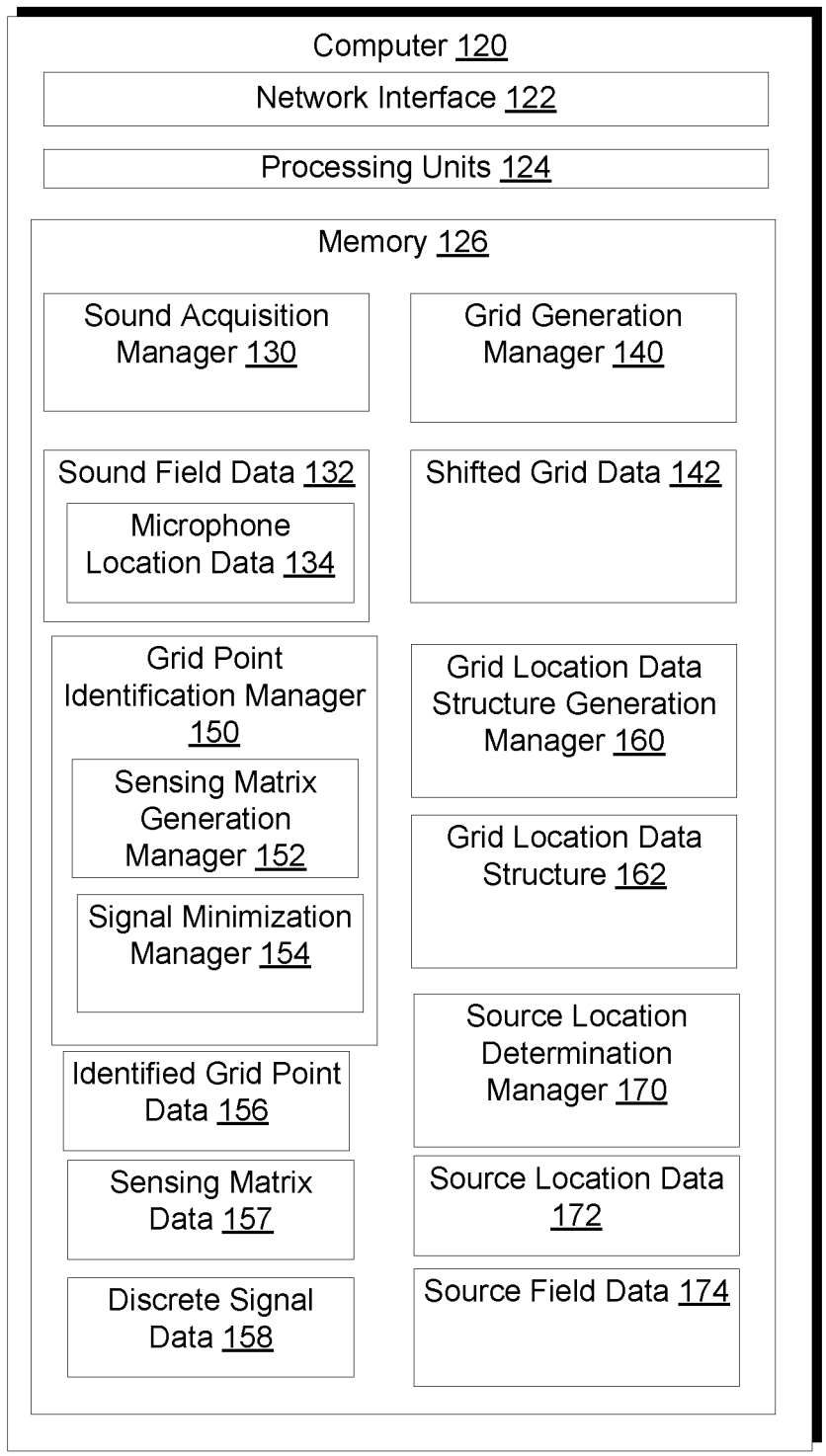
FIG. 1 is a diagram that illustrates an example electronic environment for implementing improved techniques described herein.

In some cases, the grid points will not coincide with the actual source locations. In such a case, acoustic energy may leak from the off-grid source position to the neighboring grid points, leading to expected errors in the sparse solutions. Arbitrarily increasing the grid size to achieve a better coverage of the acoustic scene is not allowed, as this will cause the violation of the restricted isometry property defined in CS.

In contrast to the above-described conventional CS techniques in which misalignment of grid points with source locations may cause energy leakage to neighboring grid points, improved techniques involve a wideband joint acoustic source localization and acquisition approach in light of sparse optimization framework based on an orthogonal matching pursuit-based grid-shift procedure. Along these lines, a specific grid structure is constructed with the same number of grid points as compared to the on-grid case, but which is "shifted" across the acoustic scene. More specifically, it is expected that each source will be located close to a grid point in at least one of the set of shifted grids. The sparse solutions corresponding to the set of shifted grids are combined to obtain the source location estimates. The estimated source positions are used as side information to obtain the original source signals. It is expected that each source will be located close to a grid point in at least one of the set of shifted grids.

Advantageously, the improved techniques may be used to determine the effect of estimating the acoustic source locations in a joint fashion with source acquisition in the presence of misalignment between the grid points and the actual source locations. Such techniques result in a more realistic solution by assuming that the sources are located in a certain distance from the grid-points rather than assuming that the grid points are close enough to the true source locations. Further, the orthogonal matching pursuit-based grid-shift procedure is a greedy sparse recovery algorithm that has a low computationally complexity.

Before proceeding to the description of the improved techiques, a short overview of the sparse recovery framework is provided. Assume that a signal $x \in \mathbb{C}^N$ can be represented as $x = \Psi s$, where $\Psi \in \mathbb{C}^N$ is a transform basis and $s \in \mathbb{C}^N$ denotes the transform coefficients vector. If s has only K'N non-zero components, then x is called K-sparse.

Also consider an M×N matrix $\Phi$ corresponding to the measurement process of signal x with M<N, where the rows of $\Phi$ are incoherent with the columns of $\Psi$. It is possible to obtain directly a compressed set of measurements y if the signal x is sparse in $\Psi$, as follows $$y = \Phi x \stackrel{x=\Psi s}{=} \Psi_s \stackrel{A\Phi\Psi}{=} As, \tag{1}$$

where $A \in \mathbb{C}^{M \times N}$ corresponds to the sensing matrix. In real world applications the compressed measurements can be corrupted by noise $n \in \mathbb{C}^M$, leading to erroneous measurements of the form y=As+n. Given the compressed measurements y and the sensing matrix A an $\ell_1$-minimization problem can be solved to recover the sparse vector s as follows $$\hat{s} = \arg\min_s \|s\|_1, \text{ s.t. } \|y - As\|_2 \le \varepsilon, \quad (2)$$

which provides a recovery consistent with the observed measurements with an approximation error y−As up to the noise level ε. The problem (2) is guaranteed to provide an accurate sparse solution with high probability, if the restricted isometry property (RIP) of order K $$(1-\delta_K)\|s\|_2^2 \le \|As\|_2^2 \le (1+\delta_K)\|s\|_2^2 \quad (3)$$

is satisfied for sufficiently small values $\delta_K > 0$. However, it is computational intractable to explicitly verify the RIP as expressed in (3) especially for large size matrices, and thus it is preferable to use properties of the sensing matrix per se that are easily computable towards providing recovery guarantees. The coherence of a matrix is one such property defined as $$\mu = \max_{1 \le i,j \le N} \frac{|a_i^H a_j|}{\|a_i\|_2 \|a_j\|_2} \quad (4)$$

where $a_i$ and $a_j$ denote the i-th and j-th column, respectively, of the sensing matrix A. It is noted that the lower the coherence the higher the probability to obtain a correct estimation of the sparse vector s, which translates into linear independence among the columns of A. However, it a trade-off exists between the sparse recovery accuracy and the coherence violation. In other words, if the sparsity level is increased by increasing the dimension of the vector s (leading to a higher number of columns in A), then the sparse recovery estimation is prone to provide a deteriorated performance due to larger inter-column linear dependence. In addition, as stated previously, inadequate discretization of the acoustic scene could lead to spectral leakage phenomena as a result of the so-called basis mismatch between the continuous physical model and the discretized assumed model reflected in A. The aforementioned issues may be efficiently tackled by introducing the concept of grid-shift.

As a first step towards joint wideband acoustic source localization and acquisition, the focus is given on computing the source positions. The location estimation problem is formulated in terms of a sparse recovery problem.

Assume M microphones and K acoustic sources, with K<M, placed at random within the acoustic scene which corresponds to a box-shaped room of arbitrary dimensions. The acoustic transfer function for each source-microphone pair is estimated based on the Image-Source model. Denote the position of the m-th microphone and the i-th source as $q_m \in \mathbb{R}^3$ and $p_i \in \mathbb{R}^3$, respectively. The physical model of the signal propagation between source i and microphone m accounting for the reflections onto the walls can be expressed via the Green's transfer function as follows $$A_{m,i}(\omega) = \sum_{v=1}^{V} \frac{\rho^v}{4\pi \|p_{i,v} - q_m\|_2^\alpha} e^{-j\omega \|p_{i,v} - q_m\|_2/c} \quad (5)$$

where c is the speed of sound and α is the attenuation factor depending on the nature of the propagation (if α=1, a spherical propagation is assumed). The location of the v-th image source corresponding to the true source located at $p_i$ with the corresponding reflective energy ratio of $\rho^v$ (the total number of reflections is equal to V) is denoted as $p_{i,v}$ and $\omega=2\pi f$ is the angular frequency (f is the frequency in Hz). In the case of an anechoic environment, (5) collapses to $$A_{m,i}(\omega) = \frac{e^{-j\omega \|p_i - q_m\|_2/c}}{4\pi \|p_i - q_m\|_2}. \quad (6)$$

Discretizing the area of interest into N»K grid-points, where each acoustic source could be possibly located to one out of N grid-points, the wideband acoustic source localization problem can be formulated as a linear model in the time-frequency domain as follows:

$$y_m(t, \omega_l) = \sum_{i=1}^{K} A_{m,i}(\omega_l) s_i(t, \omega_l) + n_m(t, \omega_l) \quad (7)$$

for all m=1, . . . , M, where t=1, . . . , T and l=1, . . . , F is the time frame and angular frequency index, respectively. The total number of analysis frames and the number of frequency bins is denoted as T and F, respectively. Using matrix form notation, (7) can be written as $$y(t,\omega_l)=A(\omega_l)s(t,\omega_l)+n(t,\omega_l), \quad (8)$$

where y(t, $\omega_l$)∈$\mathbb{C}^M$ denotes the complex-valued data vector from the observations at the M microphones, s(t, $\omega_l$)∈$\mathbb{C}^N$ is the unknown vector of the complex source amplitudes at all N grid-points of the grid of interest and n(t, $\omega_l$)∈$\mathbb{C}^M$ is the additive noise error term. The sensing matrix $$A(\omega_l)=[a(p_1)|a(p_2)| \ldots |a(p_N)]\in \mathbb{C}^{M \times N} \quad (9)$$

acts as a mapping of the source vector s(t, $\omega_l$) to the observations y(t, $\omega_l$) whose columns are the propagation vectors at all N grid-points.

The problem of acoustic source localization is to recover the source vector s(t, $\omega_l$) given the observation vector y(t, $\omega_l$) and the sensing matrix A($\omega_l$). In principle, only a few sources generate the acoustic field, and thus we can assume that K<M«N which means that problem (8) is underdetermined. Applying the sparse recovery framework as described in the previous section, acoustic source localization can be achieved by solving the optimization problem (2), which can be written as $$\hat{s}(t, \omega_l) = \arg\min_s \|s\|_1, \text{ s.t. } \|y(t, \omega_l) - A(\omega_l)s\|_2 \le \varepsilon, \quad (10)$$

where ε is the noise threshold. Here, we adopt the orthogonal matching pursuit (OMP) algorithm to solve (10).

A wideband acoustic source localization as a part of a generic joint acoustic source localization and acquisition system involves incorporating and utilizing the sparse recovery model under a real-time framework. As a result, the RIP should not be violated through a large number of grid-points N, while at the same time the positions of the actual acoustic sources are assumed to rarely be in close proximity to the grid-points especially in real-life scenarios (i.e., energy leakage will be observed from the actual source locations to the neighboring grid-points).

In order to alleviate these issues, the concept of grid-shift is introduced. In particular, assume that a sensing matrix $$A_r(\omega_l)=[a(p_1^r)|a(p_2^r)| \ldots |a(p_N^r)] \in \mathbb{C}^{M \times N} \quad (11)$$

corresponds to the r-th grid $$G_r=[p_1^r p_2^r \ldots p_N^r] \in \mathbb{R}^{3 \times N} \quad (12)$$

where $p_n^r \in \mathbb{R}^3$ with $n=1, \ldots, N$ are the coordinates of the grid-points corresponding to the r-th grid. The grid size N is defined a-priori and a shifting procedure is followed to "scan" the entire box-shaped room. The process is iterative, and during each iteration (10) is solved for each grid $G_r$ and for each time-frequency bin $(t, \omega_l)$.

Algorithm 1 summarizes the wideband acoustic source localization procedure solving the $\ell_1$-norm optimization problem as defined in (10) using the concept of grid-shift to compensate for the off-grid source locations. In line 6, $L_r(t, \omega_l, :)$ denotes a N-dimensional vector, for fixed t and $\omega_l$, in three-dimensional matrix $L_r$, while in line 13 the notation $G_r(:, \hat{l}_k^r)$ corresponds to the $\hat{l}_k^r$-th column of the matrix $G_r$. In order to lower the source localization complexity, a peak picking algorithm is applied to estimate the ten maximum spectral components of each time frame during the grid-shift process. Finally, the source location estimates provided by the K-means clustering, are used as input parameters during the source acquisition method.

---

Algorithm 1: Acoustic source localization using grid-shift

---

Input y(t, $w_l$), t = 1, ..., T, l = 1 ..., F
grids $G_r$, r = 1, ..., R, where R is the total number of grid-shifts
tolerance ε, number of sources K
Output estimated source locations
for r = 1 to R do
  for t = 1 to T do
    for l = 1, ..., F do
      built matrix $A_r(\omega_l)$ using the current grid $G_r$ according to
      (11) $\hat{s}(t, \omega_l)$ = argmin$_s$||s||$_1$, s. t. ||y(t, $\omega_l$) − $A_r(\omega_l)$s||$_2$ ≤ ε
      $L_r(t, w_l, :) \leftarrow \hat{s}(t, \omega_l)^T$
    end
  end
  $L_r \in \mathbb{C}^{T \times F \times N}$
  compute the magnitude of all T × F sparse solutions: |$L_r$|
  compute the mean $\mu_r \in \mathbb{R}^{N \times 1}$ corresponding to all the T × F sparse solutions |$L_r$|
  find the indices $\{\hat{l}_1^r, ..., \hat{l}_K^r\}$ of the top-K (maximum) values of the mean $\mu_r$
  find the current source position estimates $\hat{Q}_r = [G_r(:, \hat{l}_1^r), ..., G_r(:, \hat{l}_K^r)] \in \mathbb{R}^{3 \times K}$
end
stack all the estimated source positions into one matrix $\hat{Q} = [\hat{Q}_1^T ... \hat{Q}_R^T]^T \in \mathbb{R}^{3 \times RK}$
estimate source locations $\hat{P} \in \mathbb{R}^{3 \times K}$ by K-means clustering

---

After the source locations are estimated, the acquisition of the original sources is performed. For this task, a grid of the same size N is built located in the center of the room. The grid-points that are closest to the estimated source locations are replaced by the corresponding estimated locations' three-dimensional coordinates.

Then, the optimization problem (10) is solved to obtain the estimated short-time Fourier transform (STFT) representation of each source. The inverse STFT is then applied for each source to compute the corresponding time-domain signal. Algorithm 2 summarizes the source acquisition process. The notation $L(:, :, g_k)$ denotes the $g_k$-th page of the three-dimensional matrix L.

---

Algorithm 2: Acoustic source acquisition

---

Input estimated source locations $\hat{P}$
grid G of size N centered in the middle of the acoustic scene
Output separated sources (in the time domain)
find the indices $g_1, ..., g_K$ of the grid points in G which are closest to the estimated source locations $\hat{P}$ obtain grid $\tilde{G}$ by replacing the K grid points found in the previous step with the source location estimates $\hat{P}$
for t = 1 to T do
  for l = 1, ..., F do
    built matrix $\tilde{A}(\omega_l)$ using the grid $\tilde{G}$ according to (11)
    $\hat{s}(t, \omega_l)$ = argmin$_s$||s||$_1$, s. t. ||y(t, $\omega_l$) − $\tilde{A}(\omega_l)$s||$_2$ ≤ ε
    $L(t, w_l, :) \leftarrow \hat{s}(\omega_l)^T$
  end
$L \in \mathbb{C}^{T \times F \times N}$
  for k = 1, ..., K do
    compute the inverse short-time Fourier transform (STFT)
    of $L(:, :, g_k)$ to obtain the k-th source time-domain signal
  end
end

---

FIG. 1 is a diagram that illustrates an example electronic environment 100 in which the above-described improved techniques may be implemented. As shown, in FIG. 1, the example electronic environment 100 includes a computer 120.

The computer 120 is configured to perform source localization and acquisition. The computer 120 includes a network interface 122, one or more processing units 124, and memory 126. The network interface 122 includes, for example, Ethernet adaptors and the like for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a sound acquisition manager 130, a grid generation manager 140, a grid point identification manager 150, a grid location data structure generation manager 160, and source location determination manager 170. Further, as illustrated in FIG. 1, the memory 126 is configured to store various data, which is described with respect to the respective managers that use such data.

The sound acquisition manager 130 is configured to acquire the sound field data y 132 and microphone location data $q_m$ 134. In some implementations, the sound acquisition manager 130 acquires the sound field data 132 and the microphone location data 134 over the network interface 122. In some implementations, the sound acquisition manager 130 acquires the sound field data 132 and the microphone location data 134 via a storage device connected to the computer 120 via a wired interface.

The grid generation manager 140 is configured to generate a main grid (i.e., the N grid points) and the shifted grid data $G_r=[p_1^r p_2^r \ldots p_N^r]$. In some implementations, the grid generation manager generates the main grid and the shifted grid data 142 based on specified room dimensions and a shifting size, e.g., a fraction of the grid size based on the number of grid points N.

Figure 2A:
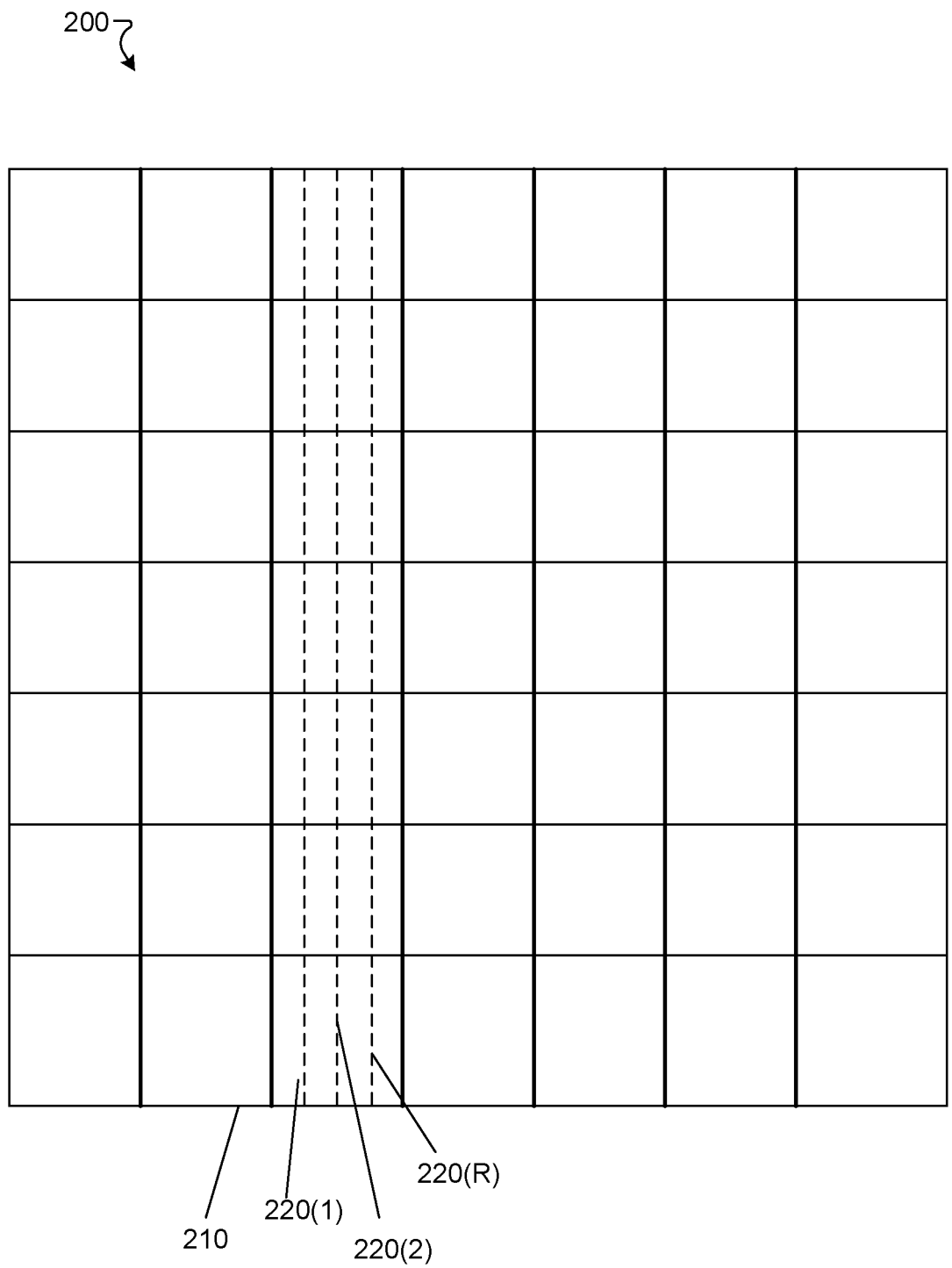
FIG. 2A is a diagram that illustrates an example shifted grid according to the improved techniques described herein.

FIG. 2A a diagram that illustrates an example shifted grid 220 within an acoustic environment 200. The acoustic environment may be, in some implementations, a box-shaped room. Such an example room may have dimension of, for example, 6×3.5×3 meters. In some implemenntations, the grid 210 may correspond to a portion of the room such as the center of the room. For example, the grid 210 may correspond to a region having dimensions 1.2×0.7×0.6 meters. Note that, while the grid 210 is shown in two dimensions in FIG. 2A, in reality the grid 210 encompasses three spatial dimensions.

As shown in FIG. 2A, the grid 210 is based on the region size, although in some implementations it may be based on the room size. Once the grid 210 is established, the shifted grids 220(1, 2, . . . , R) may be generated by the grid generation manager 140. As shown in FIG. 2A, the shifted grids 220(1, 2, . . . , R) are only shifted in a horizontal direction. In some implementations, however, the grids may be shifted with respect to the main grid in all three dimensions.

Returning to FIG. 1, The grid point identification manager 150 is configured to produce identified grid point data $\hat{i}_1^r$ 156 on each shifted grid r at which a source error is minimized as part of Algorithm 1 above. To identify such points, the grid point identification manager 150 includes a sensing matrix generation manager 152 and a signal minimization manager 154.

The sensing matrix generation 152 is configured to generate sensing matrix data $A(\omega_l)$ 157 as described above with regard to Eqs. (5) or (6). In some implementations, the sensing matrix data 157 depends on a frequency $\omega_l$.

The signal minimization manager 154 is configured to produce discrete signal data $\hat{s}(t, \omega_l)$ 158 as defined by Eq. (10) above. In some implementations, the discrete signal data 158 depends on the frequency $\omega_l$. In some implementations, the discrete signal data depends on the time t.

The grid location data structure generation manager 160 is configured to generate a grid location data structure $\hat{Q}_r=[G_r(:,\hat{i}_1^r), \ldots, G_r(:,\hat{i}_K^r)]$ 162 as described in Algorithm 1 above.

The source location determination manager 170 is configured to estimate source location data P 172 as defined in Algorithm 1 above. For example, the source location determination manager 170 produces the source location data 172 using a K-means clustering algorithm. In some implementations, the source location determination manager 170 is further configured to generate source field data 174 from the quantity $L(t, \omega_l, :)$ via a STFT algorithm as described in Algorithm 2 above.

An example localization performance of the proposed method is examined in combination with the source acquisition quality. The image-source method is used to simulate a box-shaped room of dimensions 6×3.5×3 meters and produce signals of omnidirectional speech sources at a reverberation time of 253 msec. 10 microphones spread uniformly at random were considered using all the space of dimensions 1.2×0.7×0.6 meters located in the center of the room. In each simulation, the acoustic sources were speech recordings of 3 seconds sampled at 8 kHz and had equal power. The speech recordings were randomly selected from the VOICES corpus, which is available from OGIs CSLU, consisting of 12 speakers (7 male and 5 female). To simulate different SNR values we added white Gaussian noise at each microphone. During the localization/acquisition process a grid of size 7×5×6 was used. The step size between each pair of neighboring grid points equals $\Delta p=[0.75,0.58,0.42]$ meters along x-axis, y-axis and z-axis, respectively. This specific step size satisfies the need of appropriate coverage of the room as well as achieving low computational complexity without coherence violation. Towards this threefold direction the number of grid-shifts during the localization was set to eight.

Three scenarios of two, three and four sources placed uniformly at random within the acoustic scene were considered. For processing, frames of 640 samples were used with 50% overlap and an FFT size of 1024. First, the objective was to show the effectiveness of the proposed grid-shift (GS) approach in terms of localization accuracy compared to the perturbed OMP (POMP) method under the off-grid CS assumption. POMP adapts the signal dictionary to the actual measurements by performing perturbations of the parameters governing the signal dictionary. Here, the POMP was extended to a wideband version for anechoic acoustic source localization. Under these assumptions, in this experiment, a large deviation was allowed for in the off-grid offset of each source, where each off-grid distance was drawn from a uniform distribution over the range [0.05 $\Delta p$, 0.5 $\Delta p$]. Table 1 depicts the localization root mean square error (RMSE) for both the GS and the compared POMP approach in the case of an anechoic environment, where white Gaussian noise of 5, 10, 15, 20 and 25 dB SNR is added at the microphones. It is obvious from the results that the proposed GS approach performs better in most cases.

TABLE 1

RMSE localization errors for the grid-shift (GS) and perturbed-OMP (POMP) in the case of an anechoic environment.

| SNR (dB) | two sources | | three sources | | four sources | |
|---|---|---|---|---|---|---|
| | GS | POMP | GS | POMP | GS | POMP |
| 5 | 0.2727 | 0.3864 | 0.4804 | 0.5519 | 0.3526 | 0.6528 |
| 10 | 0.3526 | 0.5626 | 0.6642 | 0.6067 | 0.4023 | 0.7309 |
| 15 | 0.3017 | 0.3908 | 0.3742 | 0.4963 | 0.4440 | 0.5609 |
| 20 | 0.3517 | 0.2828 | 0.3675 | 0.3775 | 0.3797 | 0.4385 |
| 25 | 0.3244 | 0.2464 | 0.3414 | 0.3744 | 0.3560 | 0.6497 |

In the second experiment, the localization efficiency of the proposed GS method is examined under reverberant conditions against an MVDR-based beamformer. The beamformer is based on the computation of local angular spectra applied to each microphone pair and the resulting contributions (of all microphone pairs) are then aggregated following a pooling process. The emergence of virtual sources is expected under a reverbant scenario (see (5)). As a result, the energy leakage from the off-grid source locations to the neighboring grid points in combination with the emergence of virtual sources should lead us to develop a more careful analysis of the off-grid sparse recovery problem when large off-the-grid distances appear, and thus we choose that the off-grid offset of each source will be drawn from a uniform distribution over the range [0.05 $\Delta p$, 0.2 $\Delta p$]. GS can provide an estimate of the radius of each estimated source location, while the MVDR beamformer gives an estimate only of the azimuth and elevation level of each source. Table 2 depicts the localization efficiency of the proposed GS approach against the MVDR beamformer in terms of angle-of-arrival error achieving better results in all noisy and reverberant cases.

TABLE 2

Angle-of-arrival errors for the grid-shift (GS) and MVDR in the case of a reverberant environment.

| SNR (dB) | two sources GS | two sources MVDR | three sources GS | three sources MVDR | four sources GS | four sources MVDR |
|---|---|---|---|---|---|---|
| 5  | 3.5230 | 4.8109 | 4.3875 | 6.5245 | 5.1718 | 6.1696 |
| 10 | 3.7004 | 4.7953 | 3.8504 | 5.1604 | 5.7962 | 6.1664 |
| 15 | 3.8226 | 5.7409 | 4.2013 | 5.8668 | 4.9736 | 7.4858 |
| 20 | 3.7263 | 5.0382 | 5.0752 | 6.5678 | 4.7431 | 7.1989 |
| 25 | 3.2619 | 4.8438 | 4.4231 | 6.5934 | 4.4616 | 7.4194 |

Source acquisition performance is evaluated using the Signal-to-Distortion Ratio (SDR), Signal-to-Interference Ratio (SIR) and Signal-to-Artifacts Ratio (SAR) of the separated signals with the BSSEval toolbox. Here, a reverberant framework was assumed, and thus the off-grid offset of each source was drawn from a uniform distribution over the range [0.05 $\Delta p$, 0.2 $\Delta p$].

Table 3 shows the separation quality results in the case of a noisy and anechoic environment achieving good results especially in terms of SIR.

TABLE 3

Separation performance: no noise, no reverberation.

| metric (dB) | two sources | three sources | four sources |
|---|---|---|---|
| SDR | 5.7017  | 2.9224  | 2.1949  |
| SIR | 18.6001 | 13.7273 | 11.0495 |
| SAR | 6.3163  | 4.3916  | 3.9460  |

Figure 2B:
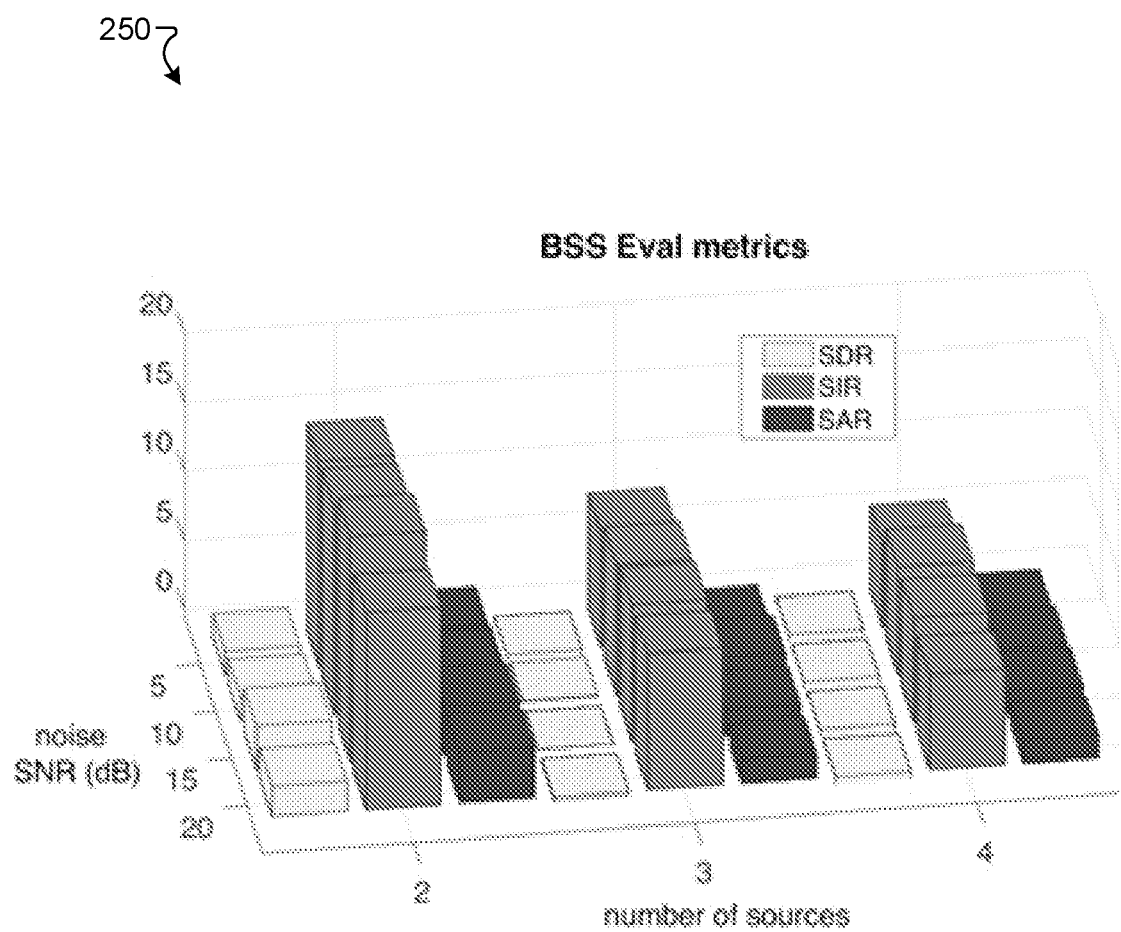
FIG. 2B is a diagram illustrating an example result of using a shifted grid to determine source localization and acquisition in a noisy, reverberant environment.

FIG. 2B is a diagram illustrating an example result of using a shifted grid to determine source localization and acquisition in a noisy, reverberant environment. The diagram illustrated in FIG. 2B depicts the BSSEval metrics in the case of a noisy and reverberant environment (added white noise (SNR 5, 10, 15, 20 dB), reverberation time 259 msec). From FIG. 2B, it may be seen that the improved techniques are promising for source separation under the off-grid sparse recovery assumption even in adverse acoustic conditions.

Figure 3:
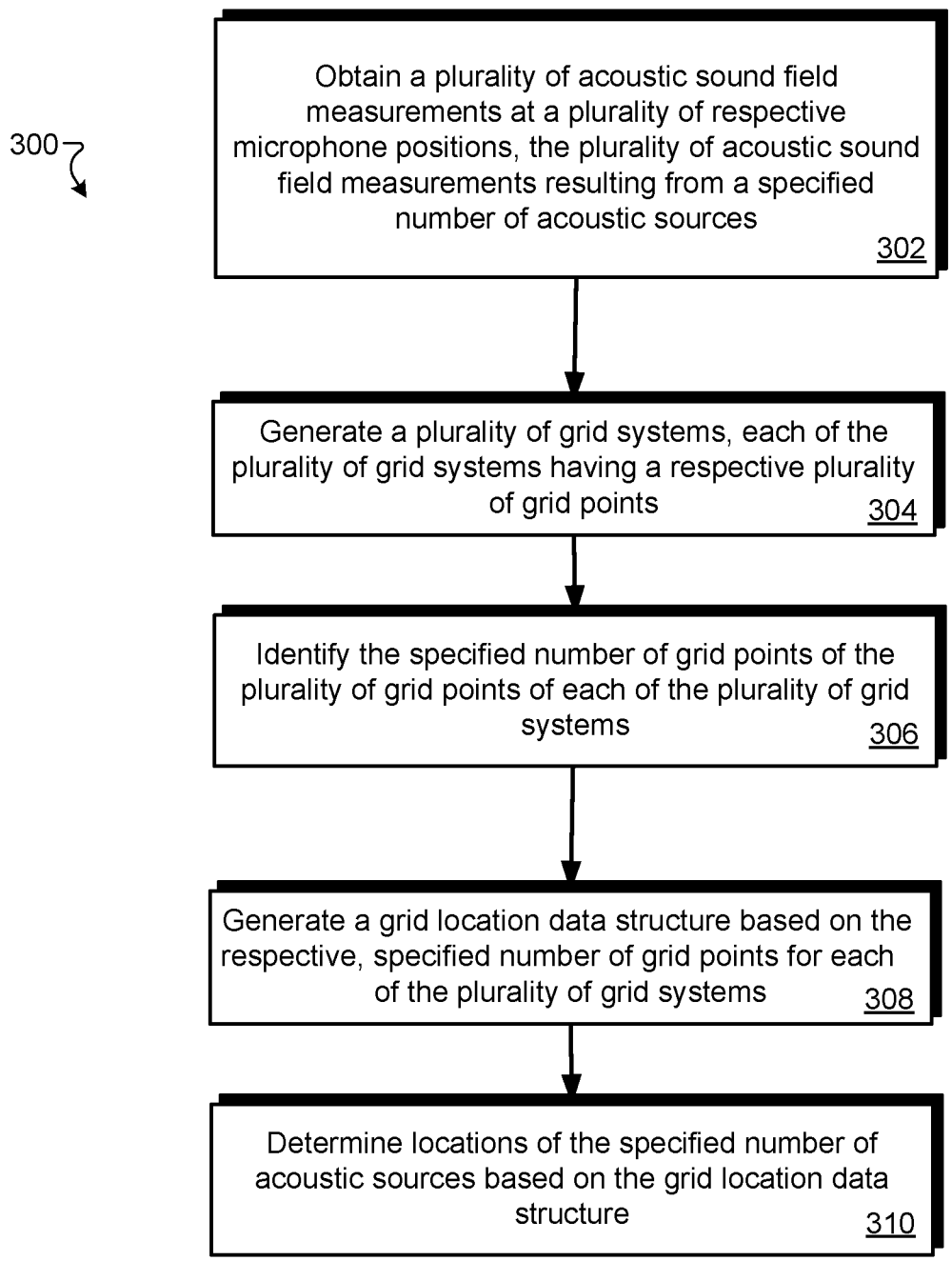
FIG. 3 is a flow chart that illustrates an example method of performing the improved techniques within the electronic environment shown in FIG. 1.

FIG. 3 is a flow chart that illustrates an example method 300 of performing source localization. The method 300 may be performed by software constructs described in connection with FIG. 1, which reside in memory 126 of the sound rendering computer 120 and are run by the set of processing units 124.

At 302, the sound acquisition manager obtains a plurality of acoustic sound field measurements (e.g., sound field data 132) at a plurality of respective microphone positions (e.g., microphone location data 134), the plurality of acoustic sound field measurements resulting from a specified number of acoustic sources.

At 304, the grid generation manager 140 generates a plurality of grid systems (e.g., shifted grid data 142), each of the plurality of grid systems having a respective plurality of grid points.

At 306, the grid point identification manager 150 identifies the specified number of grid points (e.g., identified grid point data 156) of the plurality of grid points of each of the plurality of grid systems.

At 308, the grid location data structure generation manager 160 generates a grid location data structure (e.g., grid location data structure 162) based on the respective, specified number of grid points for each of the plurality of grid systems.

At 310, the source location determination manager 170 determines locations of the specified number of acoustic sources (e.g., source location data 172) based on the grid location data structure.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the sound rendering computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the sound rendering computer 120.

The components (e.g., managers, processing units 124) of the sound rendering computer 120 can be configured to operate based on one or more platforms (e.g., one or more similar or different platforms) that can include one or more types of hardware, software, firmware, operating systems, runtime libraries, and/or so forth.

The components of the sound rendering computer 120 can be, or can include, any type of hardware and/or software configured to process attributes. In some implementations, one or more portions of the components shown in the components of the sound rendering computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the sound rendering computer 120 can be, or can include, a software module configured for execution by at least one processor (not shown). In some implementations, the functionality of the components can be included in different modules and/or different components than those shown in FIG. 1.

In some implementations, the components of the sound rendering computer 120 (or portions thereof) can be configured to operate within a network. Thus, the components of the sound rendering computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the sound rendering computer 120 can be, or can include, processors configured to process instructions stored in a memory. For example, the sound acquisition manager 130 (and/or a portion thereof), the grid generation manager 140 (and/or a portion thereof), the grid point identification manager 150 (and/or a portion thereof), the grid location data structure generation manager 160 (and/or a portion thereof), and the source location determination manager 170 (and/or a portion thereof) can include a combination of a memory storing instructions related to a process to implement one or more functions and a configured to execute the instructions.

In this work, the joint problem of wideband acoustic source localization and acquisition in a microphone array of random arrangement under a sparse recovery framework was considered. The concept of grid-shift was introduced to compensate for the displacement of the actual source positions with respect to the assumed grid-point locations. An orthogonal matching pursuit-based method was adopted to speed up the location estimation process. Then, each acoustic source was acquired based on the microphone data and the estimated sparse location vectors. It was shown, through an experimental evaluation on real speech data, that the proposed method achieves an effective joint source localization and acquisition.

Figure 4:
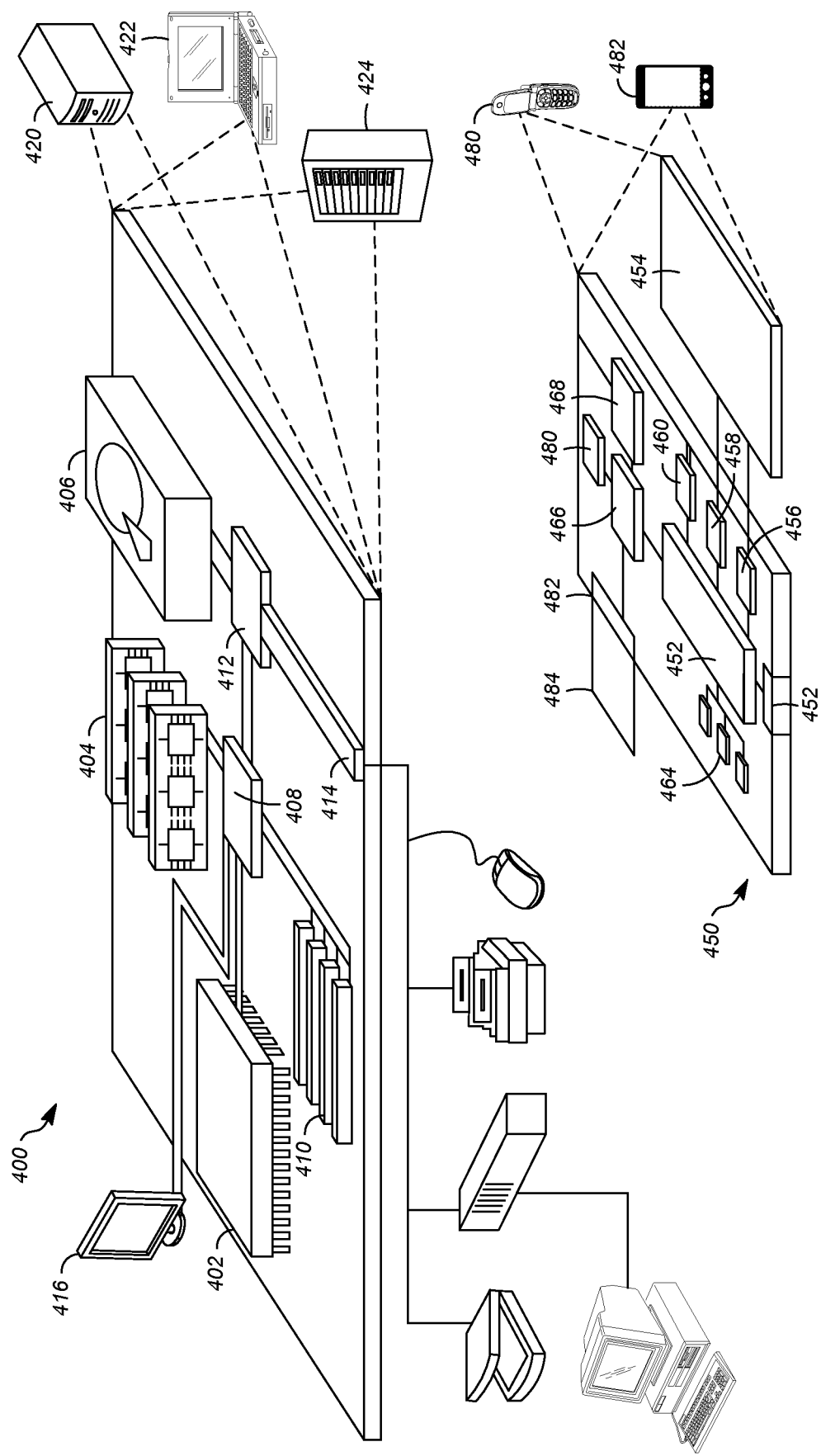
FIG. 4 illustrates an example of a computer device and a mobile computer device that can be used with circuits described here.

FIG. 4 shows an example of a generic computer device 400 and a generic mobile computer device 450, which may be used with the techniques described here. Computing device 400 is intended to represent various forms of digital computers, such as laptops, desktops, tablets, workstations, personal digital assistants, televisions, servers, blade servers, mainframes, and other appropriate computing devices. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method, comprising:
    obtaining, by processing circuitry of a computer, a plurality of acoustic sound field measurements at a plurality of respective microphone positions, the plurality of acoustic sound field measurements resulting from a specified number of acoustic sources;
    generating a plurality of grid systems, each of the plurality of grid systems having a respective plurality of grid points, the plurality of grid points of each of the plurality of grid systems being shifted with respect to the plurality of grid points of the other of the plurality of grid systems;
    identifying a specified number of grid points of the plurality of grid points of each of the plurality of grid systems;
    generating a grid location data structure based on the respective, specified number of grid points for each of the plurality of grid systems; and
    determining locations of the specified number of acoustic sources based on the grid location data structure.

2. The method as in claim 1, wherein identifying the specified number of grid points includes, for each of the plurality of grid systems:
    generating a respective sensing matrix for that grid system based on the plurality of grid points of that grid system;
    performing a signal minimization operation to produce a respective discrete signal based on the respective sensing matrix for that grid system; and
    obtaining the specified number of grid points of the plurality of grid points of that grid system based on the respective discrete signal.

3. The method as in claim 2, wherein generating the respective sensing matrix for a grid system based on the plurality of grid points of the grid system includes:
    for each of the plurality of grid points of the grid system and for a microphone position of the plurality of microphone positions:
        forming a difference between that grid point and the microphone position; and
        computing a norm of the difference.

4. The method as in claim 2, wherein for a grid system of the plurality of grid systems, the respective sensing matrix depends on a frequency, and
    wherein obtaining the specified number of grid points of the plurality of grid points of the grid system includes:
        generating an average of the respective discrete signal over a range of frequencies to produce a frequency-averaged discrete signal; and
        obtaining, as the specified number of grid points, grid points of the plurality of grid points of the grid system corresponding to a specified number of highest values of the frequency-averaged discrete signal over the plurality of points of the grid system.

5. The method as in claim 2, wherein for a grid system of the plurality of grid systems, the respective sensing matrix depends on a time, and
    wherein obtaining the specified number of grid points of the plurality of grid points of the grid system includes:
        generating an average of the respective discrete signal over a window of times to produce a frequency-averaged discrete signal; and
        obtaining, as the specified number of grid points, grid points of the plurality of grid points of the grid system corresponding to a specified number of highest values of a time-averaged discrete signal over the plurality of points of the grid system.

6. The method as in claim 1, wherein generating the grid location data structure based on the specified number of grid points for a grid system of the plurality of grid systems includes:
    concatenating the specified number of grid points of the grid system to produce the grid location data structure for the grid system.

7. The method as in claim 6, wherein determining the locations of the acoustic sources based on the grid location data structure includes:
    concatenating the grid location data structure for each of the plurality of grid systems to produce a global data structure; and
    performing a K-means clustering on the global data structure to produce the locations of the acoustic sources.

8. The method as in claim 1, further comprising:
    performing an acquisition operation to acquire an estimate of the acoustic field at the determined locations of the specified number of acoustic sources.

9. The method as in claim 8, wherein performing the acquisition operation includes:
    generating a grid based on the determined locations of the specified number of acoustic sources;
    generating a sensing matrix for the generated grid;
    performing a signal minimization operation to produce a discrete signal based on the sensing matrix for the generated grid; and
    performing an inverse short-term Fourier transform operation on the discrete signal to produce the estimate of the acoustic field.

10. The method as in claim 9, wherein generating the grid based on the determined locations of the specified number of acoustic sources includes:
    generating a first grid, the first grid including a plurality of grid points;

locating grid points of the plurality of grid points of the first grid that are closest to the determined locations of the specified number of acoustic sources;

replacing the grid points of the plurality of grid points of the first grid with the determined locations of the specified number of acoustic sources to produce the grid.

11. The method as in claim 1, wherein a number of grid points of each of the plurality of grid systems is defined a-priori.

12. The method as in claim 1, further comprising:
generating an acoustic sound field from a speaker based on the determined locations of the specified number of acoustic sources.

13. A computer program product comprising a nontransitive storage medium, the computer program product including code that, when executed by processing circuitry of a computer, causes the processing circuitry to perform a method, the method comprising:
obtaining a plurality of acoustic sound field measurements at a plurality of respective microphone positions, the plurality of acoustic sound field measurements resulting from a specified number of acoustic sources;
generating a plurality of grid systems, each of the plurality of grid systems having a respective plurality of grid points, the plurality of grid points of each of the plurality of grid systems being shifted with respect to the plurality of grid points of the other of the plurality of grid systems;
identifying a specified number of grid points of the plurality of grid points of each of the plurality of grid systems;
generating a grid location data structure based on the respective, specified number of grid points for each of the plurality of grid systems; and
determining locations of the specified number of acoustic sources based on the grid location data structure.

14. The computer program product as in claim 13, wherein identifying the specified number of grid points includes, for each of the plurality of grid systems:
generating a respective sensing matrix for that grid system based on the plurality of grid points of that grid system;
performing a signal minimization operation to produce a respective discrete signal based on the respective sensing matrix for that grid system; and
obtaining the specified number of grid points of the plurality of grid points of that grid system based on the respective discrete signal.

15. The computer program product as in claim 14, wherein generating the respective sensing matrix for a grid system based on the plurality of grid points of the grid system includes:
for each of the plurality of grid points of the grid system and for a microphone position of the plurality of microphone positions:
forming a difference between that grid point and the microphone position; and
computing a norm of the difference.

16. The computer program product as in claim 14, wherein for a grid system of the plurality of grid systems, the respective sensing matrix depends on a frequency, and
wherein obtaining the specified number of grid points of the plurality of grid points of the grid system includes:
generating an average of the respective discrete signal over a range of frequencies to produce a frequency-averaged discrete signal; and
obtaining, as the specified number of grid points, grid points of the plurality of grid points of the grid system corresponding to a specified number of highest values of the frequency-averaged discrete signal over the plurality of points of the grid system.

17. The computer program product as in claim 14, wherein for a grid system of the plurality of grid systems, the respective sensing matrix depends on a time, and
wherein obtaining the specified number of grid points of the plurality of grid points of the grid system includes:
generating an average of the respective discrete signal over a window of times to produce a frequency-averaged discrete signal; and
obtaining, as the specified number of grid points, grid points of the plurality of grid points of the grid system corresponding to a specified number of highest values of a time-averaged discrete signal over the plurality of points of the grid system.

18. The computer program product as in claim 13, wherein generating the grid location data structure based on the specified number of grid points for a grid system of the plurality of grid systems includes:
concatenating the specified number of grid points of the grid system to produce the grid location data structure for the grid system.

19. The computer program product as in claim 18, wherein determining the locations of the acoustic sources based on the grid location data structure includes:
concatenating the grid location data structure for each of the plurality of grid systems to produce a global data structure; and
performing a K-means clustering on the global data structure to produce the locations of the acoustic sources.

20. The computer program product as in claim 13, further comprising:
performing an acquisition operation to acquire an estimate of the acoustic field at the determined locations of the specified number of acoustic sources.

21. The computer program product as in claim 20, wherein performing the acquisition operation includes:
generating a grid based on the determined locations of the specified number of acoustic sources;
generating a sensing matrix for the generated grid;
performing a signal minimization operation to produce a discrete signal based on the sensing matrix for the generated grid; and
performing an inverse short-term Fourier transform operation on the discrete signal to produce the estimate of the acoustic field.

22. The computer program product as in claim 21, wherein generating the grid based on the determined locations of the specified number of acoustic sources includes:
generating a first grid, the first grid including a plurality of grid points;
locating grid points of the plurality of grid points of the first grid that are closest to the determined locations of the specified number of acoustic sources;
replacing the grid points of the plurality of grid points of the first grid with the determined locations of the specified number of acoustic sources to produce the grid.

23. The computer program product as in claim 13, wherein the method further comprises:

generating an acoustic sound field from a speaker based on the determined locations of the specified number of acoustic sources.

* * * * *